(12) United States Patent
Lee et al.

(10) Patent No.: US 8,411,130 B2
(45) Date of Patent: Apr. 2, 2013

(54) APPARATUS AND METHOD OF VIDEO CONFERENCE TO DISTINGUISH SPEAKER FROM PARTICIPANTS

(75) Inventors: Jun Haeng Lee, Hwaseong-si (KR); Byung Chang Kang, Yongin-si (KR); Jong Ho Bang, Suwon-si (KR); Keun Joo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 12/851,595

(22) Filed: Aug. 6, 2010

(65) Prior Publication Data

US 2011/0157299 A1 Jun. 30, 2011

(30) Foreign Application Priority Data

Dec. 24, 2009 (KR) ........................ 10-2009-0130490

(51) Int. Cl.
*H04N 7/14* (2006.01)
(52) U.S. Cl. .................. 348/14.08; 348/14.07
(58) Field of Classification Search .... 348/14.01–14.16; 709/204; 370/260–261
See application file for complete search history.

(56) References Cited

U.S. PATENT DOCUMENTS

| 2009/0054107 A1 | 2/2009 | Feland, III et al. |
| 2010/0085415 A1* | 4/2010 | Rahman ...................... 348/14.08 |
| 2010/0309284 A1* | 12/2010 | Samadani et al. .......... 348/14.08 |

FOREIGN PATENT DOCUMENTS

| JP | 2005-197945 | 7/2005 |
| JP | 2007-221363 | 11/2005 |
| JP | 2007-221363 | 8/2007 |
| JP | 2008-278166 | 11/2008 |
| KR | 10-2003-0096146 | 12/2003 |
| KR | 10-2004-0079973 | 9/2004 |
| KR | 10-2005-0053604 | 6/2005 |
| KR | 10-2007-0040850 | 4/2007 |
| KR | 10-0784971 | 12/2007 |

* cited by examiner

*Primary Examiner* — Melur Ramakrishnaiah
(74) *Attorney, Agent, or Firm* — NSIP Law (57) ABSTRACT

Disclosed are a system and a method that generates image data that represent a speaker to be distinguished, and enables a mobile terminal to provide a video conference service using the image data that distinguishes the speaker. A video conference apparatus may include a speaker distinguishing unit to distinguish, as a speaker, a participant who is speaking from a plurality of participants in the video conference and an image data generating unit to generate image data that represents the distinguished participant differently from other participants.

10 Claims, 8 Drawing Sheets

APPARATUS AND METHOD OF VIDEO CONFERENCE TO DISTINGUISH SPEAKER FROM PARTICIPANTS

CROSS-REFERENCE TO RELATED APPLICATION(S)

This application claims the benefit under 35 U.S.C. §119 (a) of Korean Patent Application No. 10-2009-0130490, filed on Dec. 24, 2009, in the Korean Intellectual Property Office, the entire disclosure of which is incorporated herein by reference for all purposes.

BACKGROUND

1. Field

The following description relates to a system and method that generates image data representing a speaker distinguished from other participants in a video conference, and enables a mobile terminal to provide a video conference service based on the image data that represents the distinguished speaker.

2. Description of Related Art

A teleconference is a conference among several people separated from one another while using a communication system including several terminals and transmission lines. During the teleconference, each person may view images of other people in the conference and may experience the conference as if all the persons are in a same conference room.

The teleconference may support the conference among the people separated from one another, and may represent information associated with an appearance of all participants as an image along with providing a voice, and thus, the teleconference is also referred to as a "video conference" or a TV "conference."

A system for the teleconference basically include a camera, an image compression restoring codec, a monitor, a microphone, and a speaker set in each conference room in which the conference is held, and each conference room is linked by an interactive image line and a voice line or is linked by a dedicated line. In 1990, ITU-T defined a world standard for teleconferences and recommended use of the standard.

Recently, personal computers support a teleconference scheme that has been provided in which, during the conference, users may share material stored in the computer and may utilize a function of writing or drawing on a monitor of another participant with an electronic pen.

Also, a teleconference system using the Internet has been released, and saving time expended for relocating for the conference, and having an effect of reducing cost and increasing productivity. Also, the teleconference system using the Internet may store a procedure or minutes of the conference as image information. Thus, the teleconference system using the Internet may provide an opportunity to perform a telemedicine service, a distance education service, and the like.

When a conference between a head office and a branch office is performed or when there is difficulty in having a conference, as conference rooms are separated from one another, the teleconference may be performed via a computer network.

Recently, a desire for a teleconference using a mobile terminal is increasing, as people conducting business trips, field service work, home-base work, etc. have increased.

However, the mobile terminal usually has a small display to provide a mobility, thus there is difficulty in sharing conference image, presentation materials, and the like.

SUMMARY

In one general aspect, there is provided an apparatus for a video conference, the apparatus comprising: a speaker distinguishing unit configured to distinguish, as a speaker, a participant who is speaking, from a plurality of participants in the video conference; and an image data generating unit configured to generate image data that represents the distinguished participant differently from other participants.

The apparatus may further include: a voice information collector comprising a plurality of voice obtaining units, the plurality of voice obtaining units respectively corresponding to the plurality of participants, wherein the voice information collector is further configured to determine a voice obtaining unit configured to collect voice information from among the plurality of voice obtaining units.

The apparatus may further include that the speaker distinguishing unit is further configured to distinguish, as the speaker, a participant in a location corresponding to the determined voice obtaining unit.

The apparatus may further include a timbre information storage unit configured to store timbre information associated with at least one participant from among the plurality of participants.

The apparatus may further include that the timbre information storage unit is further configured to store location information of a participant corresponding to the stored timbre information.

The apparatus may further include a timbre information extractor configured to extract speaker timbre information from a voice of the speaker.

The apparatus may further include that the speaker distinguishing unit is further configured to: determine whether timbre information matched to the extracted speaker timbre information is stored in the timbre information storage unit; and in response to the matched timbre information being stored in the timbre information storage unit, use location information associated with the matched timbre information to distinguish the speaker.

The apparatus may further include that the speaker distinguishing unit is further configured to: determine whether timbre information matched to the extracted speaker timbre information is stored in the timbre information storage unit; and in response to the matched timbre information not being stored in the timbre information storage unit: determine a voice obtaining unit to which the voice of the speaker is inputted; and determine a participant in a location corresponding to the determined voice obtaining unit as the speaker.

The apparatus may further include that the timbre information storage unit is further configured to stores the speaker timbre information extracted from the voice of the speaker by matching to the location information of the speaker.

The apparatus may further include that the image data comprises mobile image data for a mobile terminal.

The apparatus may further include that the image data comprises: object images extracted from a conference image, based on feature points of each of the participants; and object images respectively correspond to the participants.

The apparatus may further include that the image data comprises mobile image data that represents an object image of the speaker differently from object images of the other participants.

In another general aspect, there is provided a method of video conference, the method comprising: distinguishing, as a speaker, a participant who is speaking from a plurality of participants in the video conference; and generating image data that represents the distinguished participant differently from other participants.

The method may further include that the distinguishing comprises: determining a voice obtaining unit that collects voice information from among a plurality of voice obtaining units, the plurality of voice obtaining units respectively corresponding to the plurality of participants; and distinguishing, as the speaker, a participant in a location corresponding to the determined voice obtaining unit.

The method may further include: storing timbre information associated with at least one participant from among the plurality of participants; storing location information associated with a participant corresponding to the stored timbre information; and extracting speaker timbre information from a voice of the speaker.

The method may further include that the distinguishing: determines whether timbre information matched to the extracted speaker timbre information is stored in a timbre information storage unit; and in response to the matched timbre information being stored in the timbre information storage unit, uses location information associated with the matched timbre information to distinguish the speaker.

The method may further include that the distinguishing: determines whether timbre information matched to the extracted speaker timbre information is stored in a timbre information storage unit; and in response to the matched timbre information not being stored in the timbre information storage unit: determines a voice obtaining unit to which the voice of the speaker is inputted; and determines a participant in a location corresponding to the determined voice obtaining unit as the speaker.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
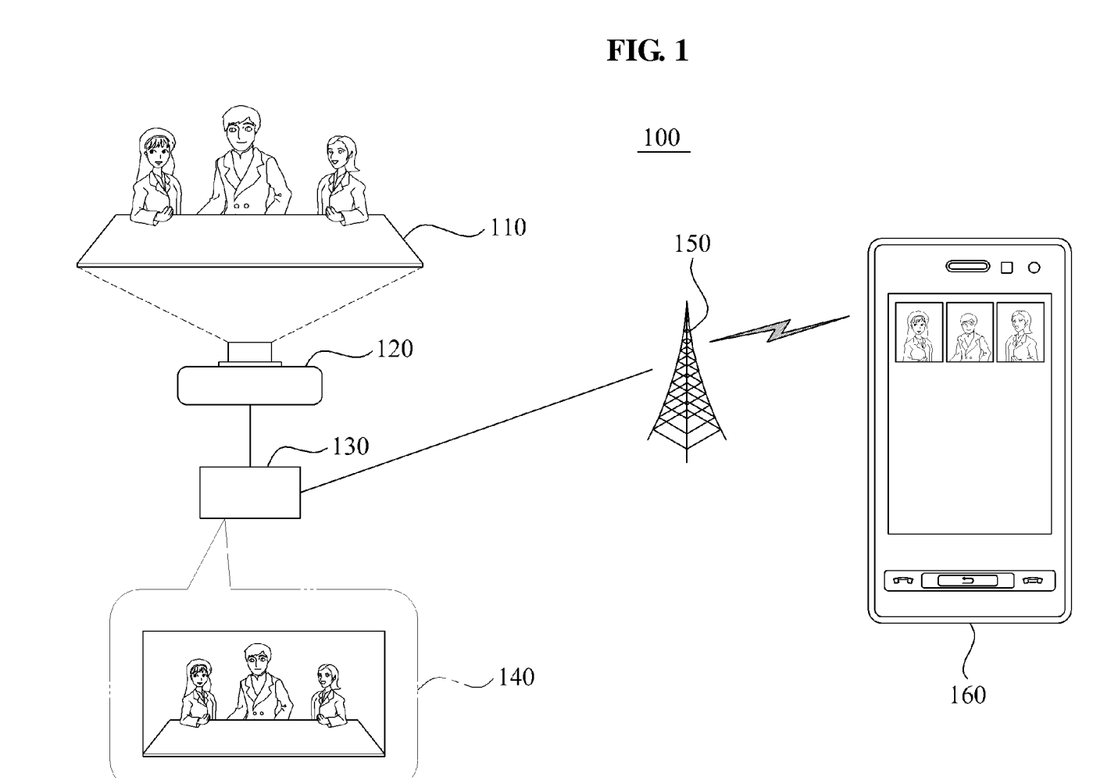
FIG. 1 is a diagram illustrating a network to which a video conference apparatus is applied according to example embodiments.

FIG. 1 illustrates a network 100 to which a video conference apparatus may be applied according to example embodiments.

The video conference apparatus may record a conference image 140 in a conference room using a recording unit 120. The recorded conference image may be image-processed in a controller 130. The controller 130 according to example embodiments may extract object images corresponding to participants 110 from the image-processed conference image. The object images may be images of the participants 110, and the object images may be information that is transmitted, through a wireless network device 150, to the mobile terminal 160, and may be represented on the mobile terminal 160.

The network 100 to which the video conference apparatus may be applied may extract the object images of all the participants 110 from the conference image 140, and may transmit, to the mobile terminal 160, image data including, for example, only information associated with the object images of the participants 110.

The mobile terminal 160 that receives the image data, including only the information associated with the object images of the participants, may arrange the transmitted object image of the participants 110 on a screen.

The image data according to example embodiments may further include information associated with a participant who is speaking, hereinafter a "speaker," and event emphasis information that emphasizes an image of the speaker, in addition to the object images.

The event emphasis information may generate an event of enlarging the image of the speaker to be larger than images of other participants, an event of blinking a frame, and the like. Accordingly, a user of the mobile terminal may easily determine the speaker among the participants 110 in the conference on a relatively small display of the mobile terminal.

As an example, when there are several conference rooms, object images of participants at each location may be grouped and may be represented on the mobile terminal, and a mobile participant may be symbolized and may be represented.

For example, when participants in the conference are from more than two locations, the video conference apparatus according to embodiments may group object images of the participants for each location and may display the grouped object images on the display of the mobile terminal.

The video conference apparatus according to embodiments may distinguish the speaker by analyzing a location of an image or timbre of a sound source, and may transmit information associated with an analysis result, enabling more effective video conference.

The video conference apparatus may approximately determine a location of the speaker based on voice information obtained by a plurality of voice obtaining units installed in the conference room to distinguish the speaker from the participants 110, and may accurately determine the location of the speaker based on image information associated with participants 110 adjacent to the approximately determined location. Determining the location of the speaker may include, for example, identifying the geographical location, a room, or a position in a room in which the speaker is located.

As another example, the video conference apparatus may store timbre information associated with the participants 110 and information associated with a location of each of the participants 110 in advance to distinguish the speaker among the participants 110. The video conference apparatus may also analyze timbre information of the speaker, and may promptly determine the location of the speaker.

The video conference apparatus according to example embodiments may select a desired participant represented on the mobile terminal and may provide a specialized service to the participant, such as a "secret note," and the like.

The video conference apparatus may enable shared presentation materials to be selectively represented on an external display connected with the mobile terminal via a wired/wireless channel.

Accordingly, according to the video conference apparatus, the conference image in the conference room may be effectively represented on the small display of the mobile terminal.

Depending on embodiments, image components that are not important for the video conference, such as a background, may not be represented, and only image components that are important for the video conference, e.g., an image of the participants may be extracted and represented, and thus, a network resource may be effective used.

Figure 2:
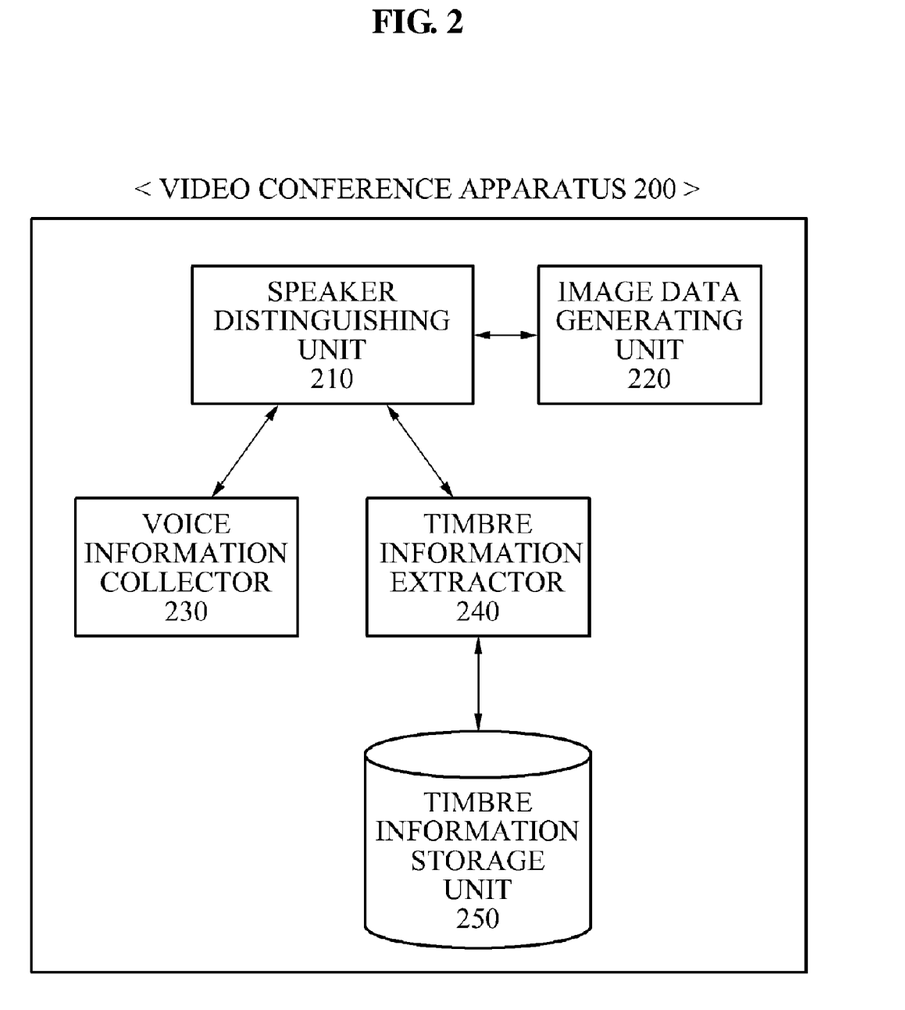
FIG. 2 is a block diagram illustrating a video conference apparatus 200 according to example embodiments.

FIG. 2 illustrates a video conference apparatus 200 according to example embodiments.

The video conference apparatus 200 according to example embodiments may include a speaker distinguishing unit 210 and an image data generating unit 220.

The speaker distinguishing unit 210 may distinguish, as a speaker, a participant who is speaking from among a plurality of participants in a video conference.

The video conference apparatus 200 may further include a voice information collector 230 to support the distinguishing performed by the speaker distinguishing unit 210.

A voice information collector 230 according to example embodiments may include a plurality of voice obtaining units, the plurality of voice obtaining units corresponding to the plurality of participants, respectively. Also, the voice information collector 230 may determine a voice obtaining unit that collects voice information from among the voice obtaining units.

For example, at least two voice obtaining units are installed in different locations in a conference room, and the voice information collector 230 may calculate a phase difference in an electrical signal of each voice obtaining unit, determining a direction of a sound source.

As an example, when the voice information collector 230 includes two voice obtaining units, e.g., a first voice obtaining unit and a second voice obtaining unit, a voice of a participant who is sitting close to the first voice obtaining unit may be transferred to the first voice obtaining unit sooner than to the second voice obtaining unit.

When the speaker speaks, the voice of the speaker may arrive at both of the voice obtaining units at different times, since the speed of sound is constant.

For example, an electrical signal may be generated from the first voice obtaining unit that is near to the speaker and, after a relatively short period of time, an electrical signal may be generated from the second voice obtaining unit. In one example, a direction of a sound may be determined by measuring a time difference between two electrical signals.

When the direction of the sound is determined, the speaker may be distinguished from among the participants.

Also, the voice information collector 230 according to example embodiments may compare a volume of a voice inputted into a voice obtaining unit, and may determine whether the speaker is a participant close to the first voice obtaining unit or a participant close to the second voice obtaining unit.

The video conference apparatus 200 according to other example embodiments may include a timbre information extractor 240 that extracts speaker timbre information from a voice of the speaker and a timbre information storage unit 250 to store timbre information associated with at least one participant from among the participants, to support the speaker distinguishing unit 210 to distinguish the speaker.

As an example, when the timbre information extractor 240 extracts timbre information from the speaker, there are two instances that may occur in which the timbre information is stored in the timbre information storage unit 250 in advance, and in which the timbre information is not stored in the timbre information storage unit 250.

The speaker distinguishing unit 210 may determine whether timbre information matched to the extracted speaker timbre information is stored in the timbre information storage unit 250, and may determine a location of the speaker through the voice information extractor 240, when the timbre information matched to the extracted speaker timbre information is stored.

The speaker distinguishing unit 210 may distinguish the speaker based on location information associated with the matched timber information.

The timbre information storage unit 250 may further store location information associated with a participant corresponding to the stored timbre information.

When the location information associated with the participant corresponding to the stored timbre information is stored, the speaker distinguishing unit 210 may extract the location information corresponding to the extracted timbre information from the timbre information storage unit 250, and may determine the location of the speaker.

The speaker distinguishing unit 210 may determine whether the timbre information matched to the extracted speaker timbre information is stored in the timbre information storage unit 250, and may control the voice information collector 230 to determine the location of the speaker when the timbre information matched to the extracted speaker timbre information is not stored.

For example, the speaker distinguishing unit 210 may determine a voice obtaining unit in which a voice of the speaker is inputted, and may distinguish, as the speaker, a participant in a location corresponding to the determined voice obtaining unit.

When the location of the speaker is determined, the timbre information storage unit 250 may store the speaker timbre information extracted from the voice of the speaker by matching to the location information of the speaker.

When the speaker distinguishing unit 210 distinguishes the speaker from the participants, the image data generating unit 220 may generate image data that represents the speaker differently from other participants. In other words, the speaker distinguishing unit 210 may be able to recognize who is speaking based on the timbre of that person's voice.

The image data generating unit 220 may extract, as object images, only participants from a recorded conference image, and may generate the image data by emphasizing an object image of the speaker among the extracted object images of the participants.

The image data may be object images extracted from the conference image, based on feature points of each of the participants, and the object images may correspond to the participants, respectively.

For example, the participants may be detected by determining whether an object image similar to a body structure of a human exists based on an edge analysis of the conference image, e.g., based on an analysis that calculates a change in an intensity of pixels around the participants. The image data generating unit 220 may determine whether the object image similar to a head and a torso exist in the recorded conference image, and may more precisely examine the object image when the object image exists.

When the object image similar to the head and the torso exists, the image data generating unit 220 may precisely determine whether feature points, such as eyes, a nose, a mouth, ears, a neck, and the like, exist in a corresponding location, and may extract a corresponding part as an object image of a participant.

Through the edge analysis, the extracted object image may be classified into a background and object images that are images of actual participants based on a frame. The classified object images may be managed by allocating corresponding IDs to the participants.

The object images may be inadvertently extracted from a drawing or from a picture in the conference room, through the edge analysis. Also, the image data generating unit 220 may measure, using infrared rays, a temperature of a target of which an object image is to be extracted, in addition to performing the edge analysis.

The image data generating unit 220 may inadvertently recognize a material that is not a human, such as a portrait, as the participant. In this instance, the image data generating unit 220 may measure a temperature of participants recorded by an infrared camera, and may determine only targets having a temperature greater than a predetermined value as participants actually participating in the conference.

When all object images of the participants are extracted, the image data generating unit 220 may receive information associated with the speaker from the speaker distinguishing unit 210, and may perform processing of a selected event on an object image corresponding to the speaker. Accordingly, the image data generating unit 220 may combine the event-processed object image of the speaker and object images of other participants, and may generate image data to be provided to a mobile terminal.

The image data may be constructed in a format of mobile image data for the mobile terminal.

The event may be one of various image process methods for distinguishing the object image of the speaker from the object images of the other participants.

The event will be described in detail with reference to FIGS. 3 through 5.

Figure 3:
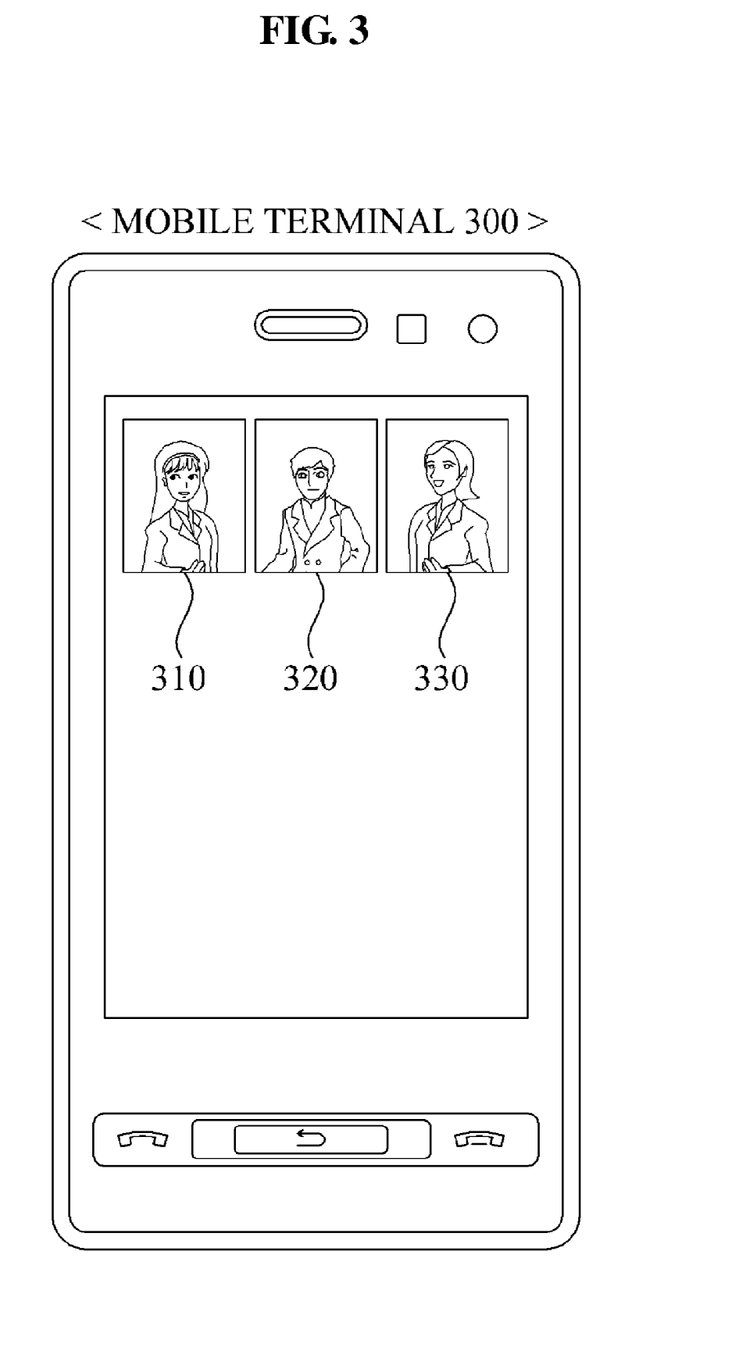
FIGS. 3 through 5 are diagrams illustrating a variety of video conference services provided in a mobile terminal interoperated with a video conference apparatus according to example embodiments.
Figure 4:
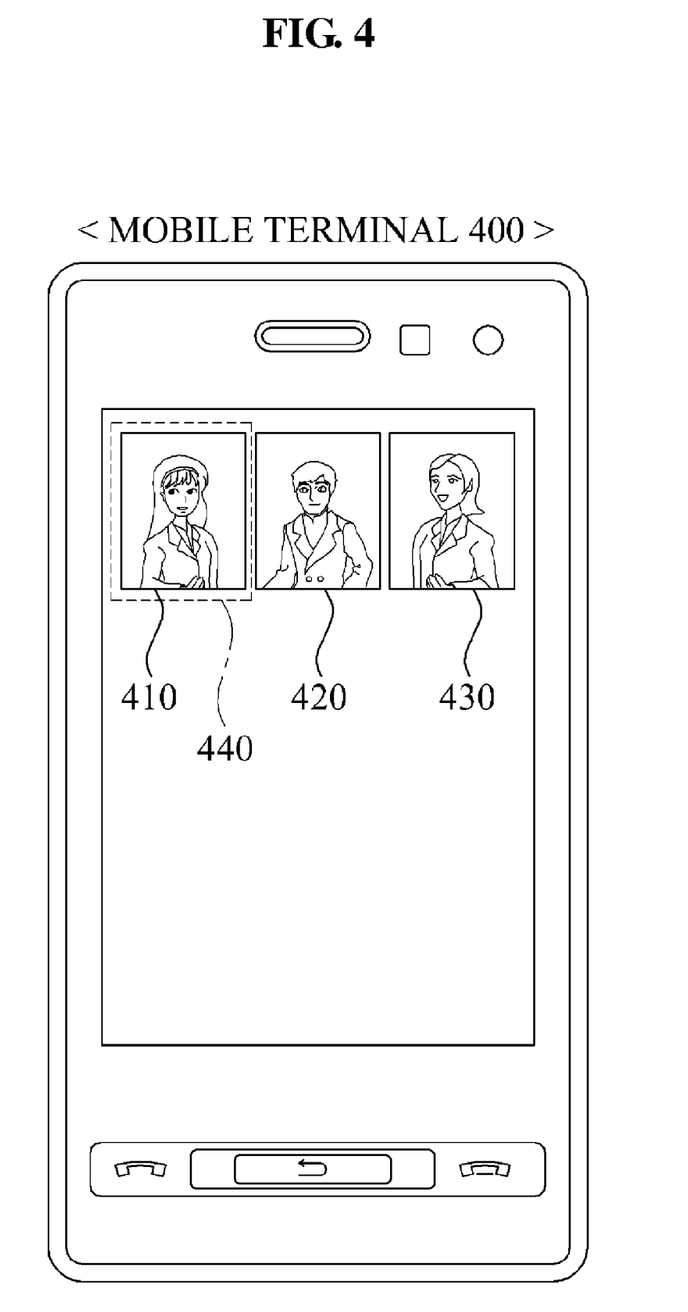
Figure 5:
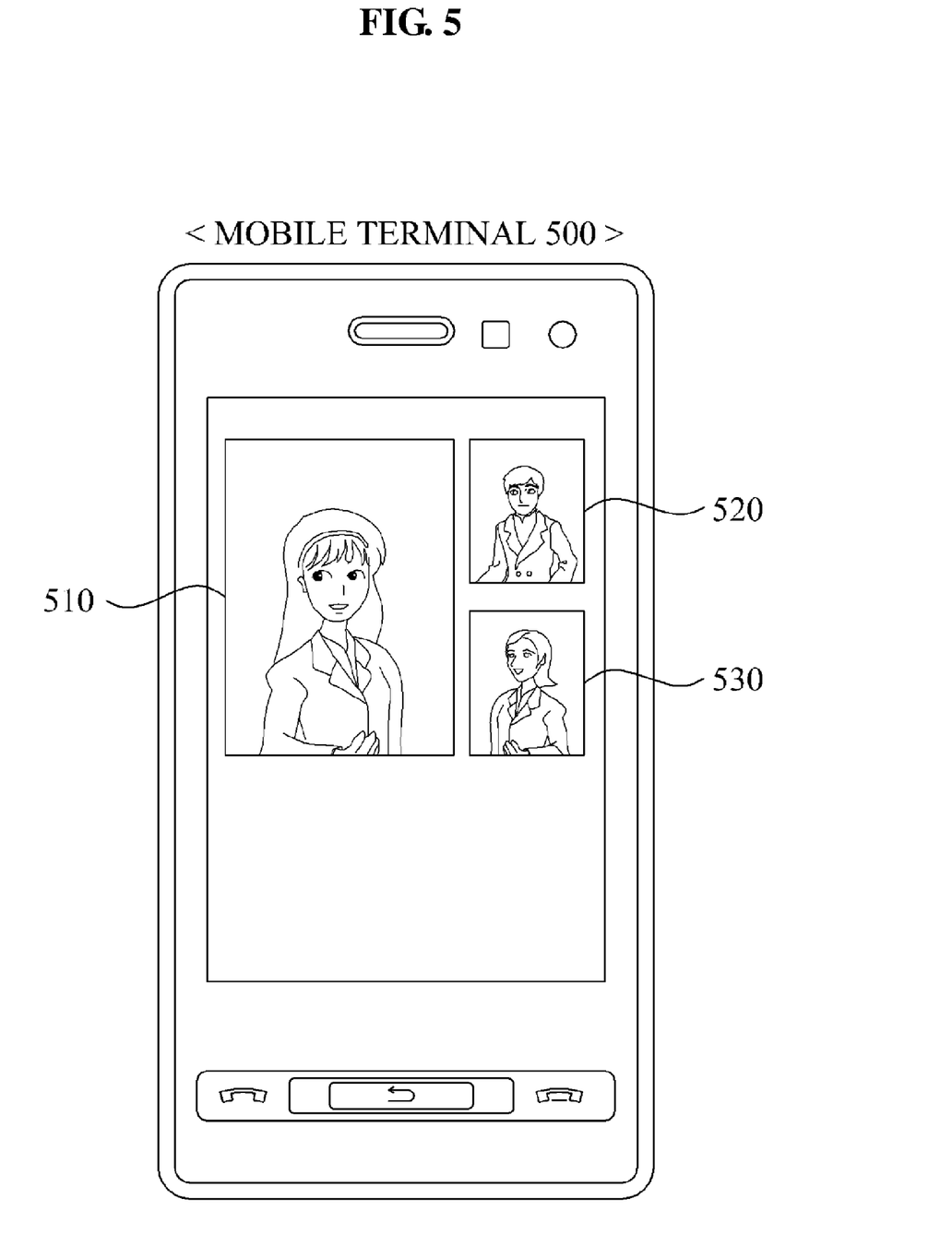

FIGS. 3 through 5 illustrate a variety of video conference services provided in a mobile terminal interoperated with a video conference apparatus according to example embodiments.

Referring to FIG. 3, object images 310, 320, and 330 are image data on which an event is not processed, and the object images 310, 320, and 330 extracted from the conference image may be represented on a display of a mobile terminal 300.

Referring to FIG. 4, when a first participant speaks, a first object image 410 corresponding to the first participant is distinguished from other object images 420 and 430.

In FIG. 4, an event of blinking a frame may be processed on the first object image 410, and thus, image data that distinguishes the first object image 410 from other object images 420 and 430 is represented in the mobile terminal 400. Other nonlimiting examples of distinguishing may include enlarging the first object image 410, and dimming the other object images 420 and 430.

Next, referring to FIG. 5, when the first participant speaks, a first object image 510 corresponding to the first participant may be distinguished from other object images 520 and 530.

In FIG. 5, image data that enlarges the first object image 510 to be distinguished from other object images 520 and 530 may be represented in a mobile terminal 500. Other nonlimiting examples of distinguishing may include blinking the first object image 410, and dimming the other object images 420 and 430.

Figure 6:
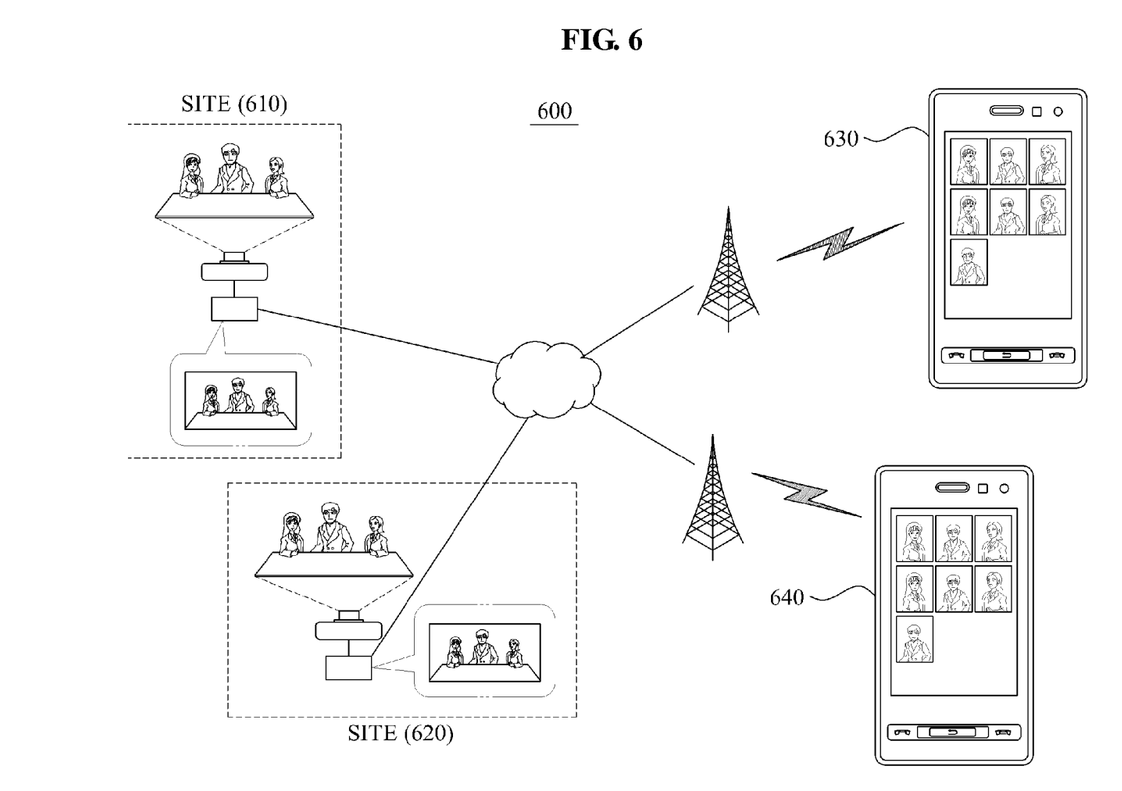
FIG. 6 is a diagram illustrating a network to which a video conference apparatus is applied according to other example embodiments.

FIG. 6 illustrates a network to which a video conference apparatus is applied according to other example embodiments.

The video conference apparatus according to other example embodiments may provide a video conference service in which a plurality of mobile terminals 630 and 640 participate when conference rooms 610 and 620 are located in a plurality of sites.

The video conference apparatus may assign an identifiable ID to each of voice obtaining units and to each of participants in advance, and may determine a speaker based on a corresponding ID. The video conference apparatus may determine a corresponding conference room, may determine the speaker from among participants in the corresponding conference room, and may generate image data to provide the image data to conference rooms and mobile terminals.

The video conference apparatus may extract object images of participants in the video conference from conference images of the conference rooms. Also, the video conference apparatus may group the object images of the participants for each site, may represent the grouped object images, and may represent an object image of a mobile participant.

Also, where an image process for distinguishing the determined speaker from other participants is performed using a selected event, the image data may be generated.

Accordingly, the video conference apparatus according to other example embodiments may effectively transfer a conference image of participants in a corresponding conference room even though a user participates in a teleconference using a mobile terminal having a small display.

Also, presentation material and the like may be selectively forwarded to an external display having a large display, and thus, the conference may be effectively shared.

Figure 7:
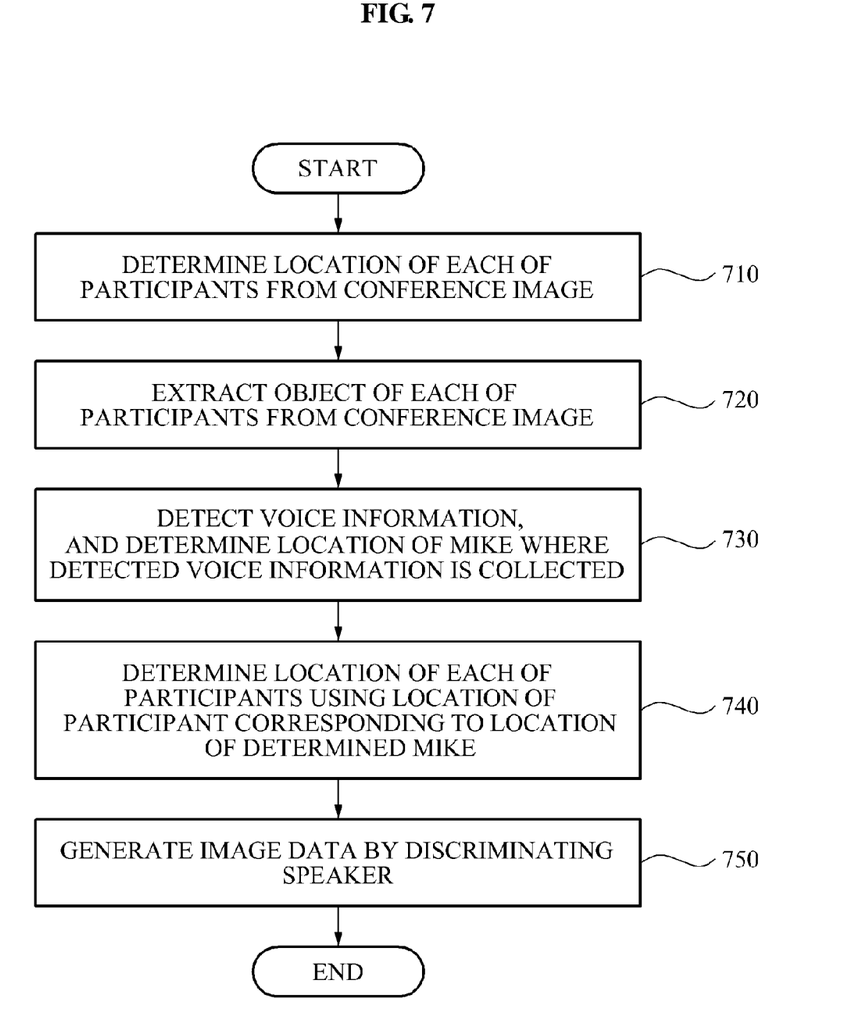
FIG. 7 is a flowchart illustrating a video conference method according to example embodiments.

FIG. 7 illustrates a video conference method according to example embodiments.

Referring to FIG. 7, in operation 710, the video conference method according to example embodiments may determine a location of each of participants from a conference image. Location information of each of the participants may be collected prior to a conference.

In operation 720, the image conference method may extract an object image of each of the participants from the conference image. The object image of each of the participants may be extracted from the conference based on an edge analysis.

In operation 730, the video conference method may detect voice information from a speaker among the participants, and may determine a location of a voice obtaining unit where the detected voice information is collected. The voice obtaining unit according to example embodiments may include a microphone. The video conference method may determine a location of at least one voice obtaining unit, each voice obtaining unit corresponding to one of the participants, and may assign an ID that identifies a corresponding microphone.

In operation 740, the video conference method may determine a location of each of the participants from the conference image using an actual location of a participant corresponding to the location of the determined microphone. Therefore, the conference method according to example embodiments may match actual locations of the participants with locations of the extracted object images of the participants In operation 750, the video conference method distinguishes the speaker from other participants and generates image data. The image data may include an object image of the speaker and object images of the other participants. Also, the image data may represent the object image of the speaker differently from the object images of the other participants. The generated image data may be transmitted to a mobile terminal and the like, and may be represented.

Figure 8:
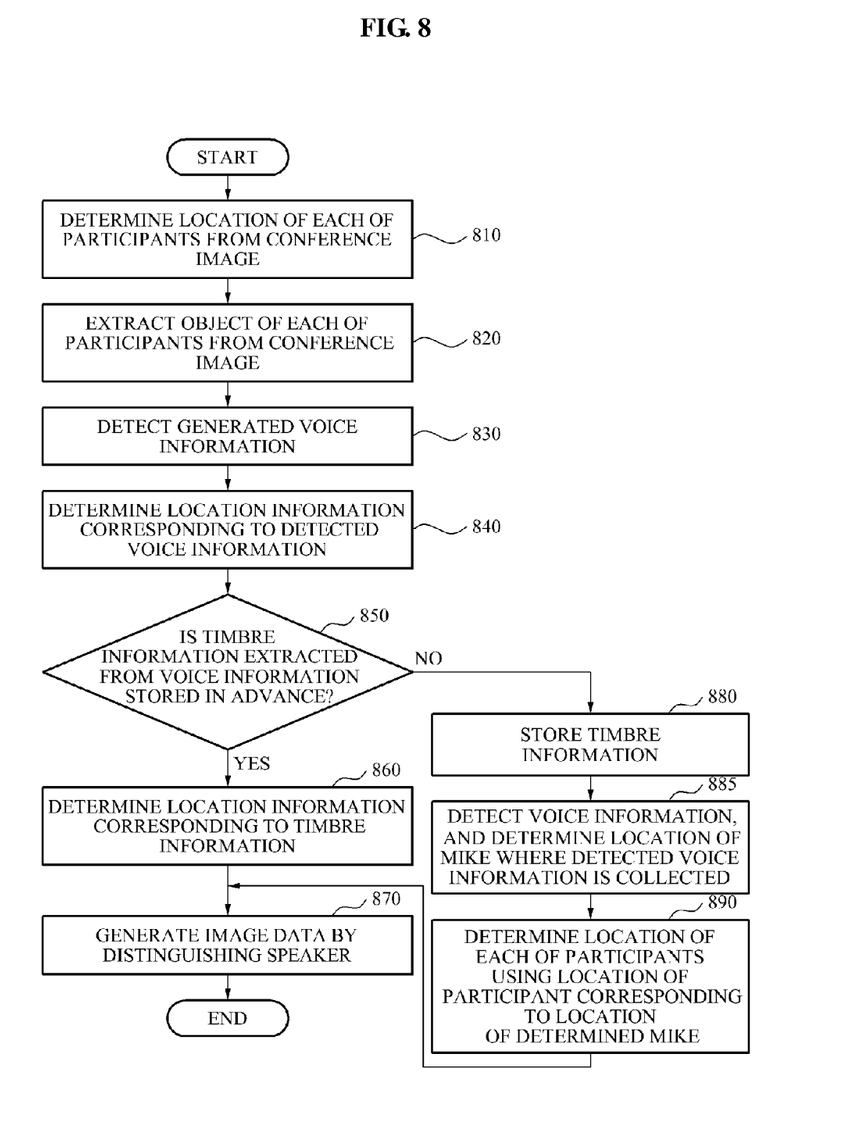
FIG. 8 is a flowchart illustrating a video conference method according to other example embodiments.

FIG. 8 illustrates a video conference method according to other example embodiments.

In operation 810, the video conference method may determine a location of each of participants from a conference image.

In operation 820, the video conference method may extract an object image of each of the participants from the conference image. In operation 830, the video conference method may detect generated voice information, and, in operation 840, may determine a location of a participant corresponding to the detected voice information, e.g., a location of a speaker.

In operation 850, the video conference method may extract timbre information from the detected voice information, and may determine whether the extracted timbre information is stored in advanced.

When the timbre information is not stored in advance, the video conference method may store the extracted timbre information in operation 880, and may proceed with operation 885 and operation 890 to determine a location of a voice obtaining unit where the voice information is collected, and determine the location of the speaker. For example, operation 885 may be identical to operation 730 and operation 890 may be identical to operation 740.

As another example, when the timbre information is stored in advance, the video conference method may determine location information corresponding to the timbre information in operation 860.

The video conference method may store, in a storage unit, the timbre information by matching to the location information.

When the location information is determined, the video conference method may distinguish the speaker, and may generate image data in operation 870.

In the same manner, an object image corresponding to the speaker is distinguished from object images of other participants, thus, the image data may be generated.

A mobile terminal may distinguish an object image of a speaker using a special mark, such as blinking of a frame of the object image, enabling a user participating in a video conference promptly recognize the speaker. According to other example embodiments, a video conference method may select an object image of a desired participant on a mobile terminal, and may provide a specialized service, such as a "secret note" or private message to the selected participant.

According to example embodiments, a mobile terminal may be connected with an external display via a wired/wireless channel, and thus, the video conference method may support to selectively forward a shared presentation material window to the external display.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The video conference apparatus, processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), to random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for a video conference, the apparatus comprising:

a speaker distinguishing unit configured to distinguish, as a speaker, a participant who is speaking, from a plurality of participants in the video conference;

an image data generating unit configured to generate image data that represents the distinguished participant differently from other participants;

a timbre information storage unit configured to store timbre information associated with at least one participant from among the plurality of participants; and a timbre information extractor configured to extract speaker timbre information from the voice of the speaker, wherein the speaker distinguishing unit is further configured to:
  determine whether timbre information matched to the extracted speaker timbre information is stored in the timbre information storage unit, and
  in response to the matched timbre information not being stored in the timbre information storage unit:
    determine a voice obtaining unit to which the voice of the speaker is inputted;
    and
    distinguish a participant in a location corresponding to the determined voice obtaining unit as the speaker.

2. The apparatus of claim 1, further comprising:

a voice information collector comprising a plurality of voice obtaining units, the plurality of voice obtaining units respectively corresponding to the plurality of participants, wherein the voice information collector is configured to determine a voice obtaining unit that is collecting voice information from among the plurality of voice obtaining units.

3. The apparatus of claim 1, wherein the timbre information storage unit is further configured to store location information of the at least one participant corresponding to the stored timbre information.

4. The apparatus of claim 1, wherein the speaker distinguishing unit is further configured to:

in response to the matched timbre information being stored in the timbre information storage unit, use location information associated with the matched timbre information to distinguish the speaker.

5. The apparatus of claim 1, wherein the timbre information storage unit is further configured to store the speaker timbre information in association with location information of the speaker.

6. The apparatus of claim 1, wherein the image data comprises mobile image data for a mobile terminal.

7. The apparatus of claim 6, wherein the image data comprises:
  object images extracted from a conference image, based on feature points of each of the participants; and
  the object images respectively correspond to the participants.

8. The apparatus of claim 7, wherein the image data comprises mobile image data that represents an object image of the speaker differently from object images of the other participants.

9. A method of video conference, the method comprising:
  storing, in a timbre information storage unit, timbre information associated with at least one participant from among a plurality of participants in the video conference;
  storing location information associated with the at least one participant corresponding to the stored timbre information;
  extracting speaker timbre information of a participant who is speaking among the plurality of participants in the video conference;
  determining whether the extracted speaker timbre information matches timbre information stored in the timbre information storage unit;
  if the extracted speaker timbre information does not match timbre information stored in the timbre information storage unit:
    determining a voice obtaining unit to which the voice of the participant who is speaking is input, and
    determining a participant in a location corresponding to the determined voice obtaining unit as the speaker; and
  generating image data that represents the determined speaker participant differently from other participants.

10. The method of claim 9, wherein
if the extracted speaker timbre information does match timbre information stored in the timbre information storage unit, using location information associated with the matched timbre information to distinguish the speaker.

* * * * *